(12) United States Patent
Uemura et al.

(10) Patent No.: US 8,617,714 B2
(45) Date of Patent: Dec. 31, 2013

(54) SYNTHETIC RESIN LEATHER AND MANUFACTURING METHOD OF THE SAME

(75) Inventors: Tomoyuki Uemura, Saitama (JP); Toshimasa Mori, Shizuoka (JP); Yoshinari Hatori, Shizuoka (JP)

(73) Assignees: Okamoto Industries, Inc., Tokyo (JP); Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 13/074,856

(22) Filed: Mar. 29, 2011

(65) Prior Publication Data

US 2011/0244243 A1  Oct. 6, 2011

(30) Foreign Application Priority Data

Mar. 31, 2010 (JP) ................................ 2010-083702

(51) Int. Cl.
*B32B 27/40* (2006.01)
*C09J 5/00* (2006.01)

(52) U.S. Cl.
USPC ...................................... 428/423.3; 156/305

(58) Field of Classification Search
USPC .............................. 156/305, 331.7; 428/423.3
See application file for complete search history.

(56) References Cited

U.S. PATENT DOCUMENTS

| | | | | |
|---|---|---|---|---|
| 5,700,867 A | * | 12/1997 | Ishiyama et al. | 524/539 |
| 6,863,953 B2 | * | 3/2005 | Mori et al. | 428/141 |
| 2010/0075559 A1 | * | 3/2010 | Hatori et al. | 442/308 |
| 2010/0247895 A1 | * | 9/2010 | Uemura et al. | 428/317.7 |

FOREIGN PATENT DOCUMENTS

JP  2003-166181 A  6/2003

* cited by examiner

*Primary Examiner* — Thao T. Tran
(74) *Attorney, Agent, or Firm* — Fitch, Even, Tabin & Flannery, LLP

(57) ABSTRACT

In one form, the present invention provides a synthetic resin leather adhering a base material via an adhesive layer to the back side of a film composed mostly of thermoplastic polyurethane, and the film has on the surface thereof a surface treatment layer formed by coating with a surface treatment agent in which aqueous polycarbonate polyurethane is cross linked by aqueous cross-linking agent containing a carbodiimide group.

4 Claims, 1 Drawing Sheet

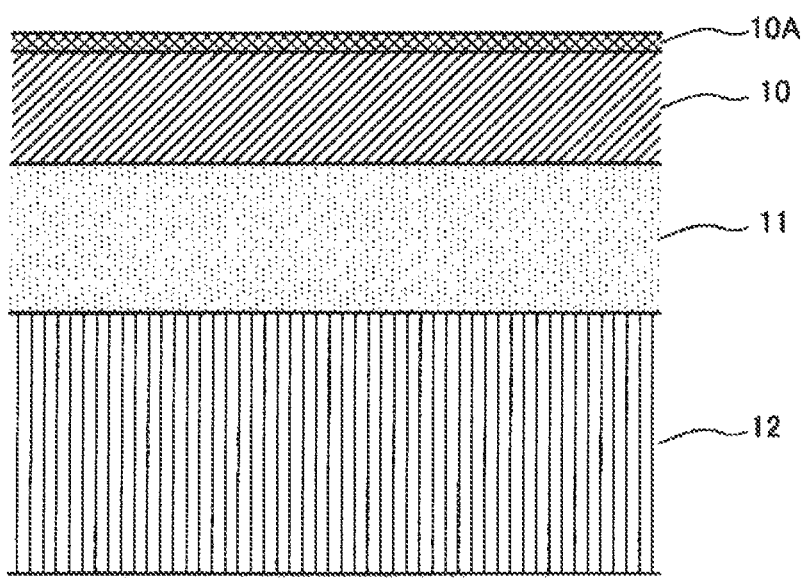

SYNTHETIC RESIN LEATHER AND MANUFACTURING METHOD OF THE SAME

RELATED APPLICATIONS

This application claims priority under 35 U.S.C. §119 to Japanese Patent Application No. JP2010-083702 filed on Mar. 31, 2010, the entire content of which is hereby incorporated herein by reference in its entirety.

FIELD OF THE INVENTION

The present invention relates to a synthetic resin leather including a film composed mostly of thermoplastic polyurethane (TPU) and a manufacturing method of the same.

BACKGROUND OF THE INVENTION

A synthetic resin leather including a film composed mostly of thermoplastic polyurethane (TPU) has a basic structure in which a base material such as woven fabric, knitted fabric or unwoven fabric is adhered to the back side of the film, and has a superior feature in flexurality (particularly cold resistant flexurality) by using a flexible film, and thus has a specific characteristic compared to so-called a synthetic leather forming a strong membrane by crosslinkage of film itself. The synthetic resin leather is widely used as a vehicle interior material making advantage of the flexurality or the flexibility thereof, and is effectively used for specific parts subject to repeated bending.

In the synthetic resin leather, polyolefin resin synthetic leather, which is more environment-friendly, has been developed from a film made of soft polyvinylchloride layer, and a film made of a mixed resin layer of thermoplastic polyurethane and acrylic soft resin has been developed pursuing further functionality.

SUMMARY OF THE INVENTION

One of the objects of the present invention is to provide a synthetic resin leather, which has abrasion resistance with respect to repeated friction in addition to high flexibility, flexurality, preferable workability and intensity, and furthermore is to provide a synthetic resin leather, which has resistance to olein acid in addition to the above characteristics.

In order to achieve the object described above, the synthetic resin leather according to the present invention and the manufacturing method of the same, includes at least the following configuration.

A synthetic resin leather including a base material adhered via an adhesive layer to the back side of the film composed mostly of thermoplastic polyurethane, wherein the film has a surface treatment layer formed on a surface thereof, and the surface treatment layer is formed by coating with a surface treatment agent in which aqueous polycarbonate polyurethane is cross linked by an aqueous crosslinking agent containing a carbodiimide group.

A method of manufacturing a synthetic resin leather comprising steps of: forming a film formed mostly of thermoplastic polyurethane; forming a surface treatment layer on the surface of the film formed by coating with a surface treatment agent in which aqueous polycarbonate polyurethane is cross linked by an aqueous cross-linking agent containing a carbodiimide group; and adhering a base material via an adhesive layer to the back side of the film.

BRIEF DESCRIPTION OF THE DRAWINGS

FIG. 1 is a view illustrating a structure of synthetic resin leather according to an embodiment of the present invention.

DETAILED DESCRIPTION OF THE PREFERRED EMBODIMENTS

Hereinafter, an embodiment of the present invention is described. The synthetic resin leather 1 according to the embodiment of the present invention shown in FIG. 1 has a structure in which a base material 12 is adhered via an adhesive layer 11 to the back side of a film 10 and a surface treatment layer 10A is formed on the surface of the film 10. The film 10 is a layer composed mostly of thermoplastic polyurethane (TPU). This layer, when composed of a mixed resin, includes a composition of 50% or more thermoplastic polyurethane, otherwise, when including a plurality of kinds of resin compositions, thermoplastic polyurethane is a composition having the highest occupancy rate. Basically, the film 10, similarly to the prior art described below, is provided with a high flexibility and flexurality and preferable workability and intensity due to a mixed resin of thermoplastic polyurethane and other resin compositions.

The film 10 includes the surface treatment layer 10A on the surface thereof, and the surface treatment layer 10A is formed by coating with a surface treatment agent in which aqueous polycarbonate polyurethane is cross-linked with aqueous cross-linking agent containing carbodiimide group. The surface treatment layer 10A can be formed including a cross-linked film with a high olein acid resistance, and thus the surface treatment layer 10A can maintain olein acid resistance in addition to abrasion resistance.

A method of manufacturing a synthetic resin leather 1 according to the embodiment of the present invention includes steps of firming a film 10 composed mostly of thermoplastic polyurethane, forming a surface treatment layer 10A on the surface of the film 10 formed by coating with a surface treatment agent in which aqueous polycarbonate polyurethane is cross-linked by an aqueous cross-linking agent containing a carbodiimide group and adhering a base material 12 on the back side of the film 10 via the adhesive layer 11.

In the step of forming the film, the film 10 composed mostly of thermoplastic polyurethane is formed by calendering, extrusion molding, etc. In the step of forming the surface treatment layer, the surface treatment layer 10A is formed by coating with the aqueous surface treatment agent on the formed film 10 and applying aging treatment against the surface of the film 10. Coating of the surface treatment agent can be applied using normal printing methods such as direct gravure printing, gravure offset printing, screen printing, etc. or coating methods such as gravure coating method, roll coating method, comma coating method, etc. Striated pattern is applied to the surface treatment film. In the step of adhering the base material, the film 10 and the base material 12 are adhered via the adhesive layer 11 by coating the back side of the film 10 or on one surface of the base material 12 with the adhesive agent.

The thermoplastic polyurethane used for the film 10 can be obtained by reacting a diisocyanate compound with a compound having two or more hydroxy groups. Above all else, polyurethane thermoplastic elastomer (TPU), composed of long-chain polyol, diisocyanate and chain extending agent, including so-called soft segment and hard segment, can be preferably used. They preferably have resin hardness of 65~90 in Shore A hardness, particularly resin hardness of 70~80. Shore A hardness shown respectively is a value measured by ASTM D 2240 (measuring temperature 23° C.).

As a diisocyanate compound for synthesizing thermoplastic polyurethane, tolylene diisocyanate, diphenylmethane diisocyanate, naphthalene diisocyanate, tolidine diisocyanate, hexamethylene diisocyanate, xylylene diisocyanate, hydrogenated xylylene diisocyanate, hydrogenated dicyclohexylmethane diisocyanate, isophorone diisocyanate, etc. are used.

Further, as a compound having two or more hydroxy groups, polyester polyol, a condensation reaction product of diacid such as adipic acid, phthalic acid, etc. and glycol such as ethylene glycol, 1,4-butanediol, etc.; polycarbonate polyol, a reaction product of carbonate such as ethylene carbonate, etc. and glycol; polyethylene glycol, polypropylene glycol, polytetramethylene glycol, polyether polyol such as polyethylene glycol-polypropylene glycol, etc. are used. In the synthetic resin leather 1 according to the embodiment of the present invention, polyether polyol is preferably used due to the property. Further, thermoplastic polyurethane made from polyether polyol, having preferable aging resistance and workability of calendering, can be preferably used from the viewpoint.

As the chain extending agent, low molecular multiple alcohol such as ethylene glycol, 1,2-propylene glycol, 1,3-propylene glycol, butane 1, 2 diol, butane 1, 3 diol, butane 1, 4 diol, butane 2, 3 diol, hexanediol, etc. or diamine and water are used.

When forming the film with a mixed resin of thermoplastic polyurethane and other resin components as described above, acrylic soft resin can be selected as one component to be mixed. The acrylic soft resin is a resin showing flexibility like flexible polyvinylchloride at room temperature. The acrylic soft resin having hardness of 50 to 80 in Shore A, particularly hardness of 55 to 65 is preferably used. The acrylic soft resin preferably has a polymer of multi layer structure, that is, a particulate polymer in which two or more kinds of acrylic polymer constitute a core-shell type multi layer structure. These acrylic soft resins show preferable flexibility at room temperature, and have bending durability and light resistance.

Hereinafter an example of the acrylic soft resin used as a component of the film 10 is described. The example is a polymer of multi layer structure in combination of: at least single-layered polymer layer [A] of 10 to 90 parts by weight at Tg of 30° C. or less, polymerizing a monomer mixture, which is composed of at least one kind of acrylic acid alkyl ester of 30 to 99.9 wt % having an alkyl group with 1 to 12 carbon numbers, at least one kind of methacrylic acid alkyl ester 0 to 70 wt % having an alkyl group with 1 to 8 carbon numbers, copolymerizational unsaturated monomer 0 to 30 wt % and polyfunctionally crosslinkable monomer and/or polyfunctional graft monomer 0. 1 to 10 wt %; and at least single-layered polymer layer [B] of 90 to 10 parts by weight at Tg of −20° C. to 50° C., polymerizing a monomer mixture, which is composed of at least one kind of acrylic acid alkyl ester of 30 to 99 wt % having an alkyl group with 1 to 12 carbon numbers, at least one kind of methacrylic acid alkyl ester 1 to 70 wt % having an alkyl group with 1 to 8 carbon numbers, and copolymerizational unsaturated monomer 0 to 30 wt %; and is an acrylic soft resin of multi layer structure in which the outermost layer is the polymer layer [B].

Hereinafter another example of the acrylic soft resin is described. Another example is composed of: a rubber layer 30 to 80 parts by weight obtained by polymerizing acrylic acid alkyl ester of 60 to 99.5 wt % having an alkyl group with 1 to 8 carbon numbers, a monofunctional monomer of 0 to 39.5 wt % having one copolymerizational vinyl group, and a polyfunctional monomer 0. 5 to 5 wt % having at least two vinyl group or vinylidene group; and a hard resin layer 20 to 70 parts by weight obtained by polymerizing methacrylic acid methyl of 40 to 100 wt %, acrylic acid alkyl ester 0 to 60 wt % having an alkyl group with 1 to 8 carbon numbers, and a monomer of 0 to 20 wt % having copolymerizational vinyl group or vinylidene group; and is an acrylic soft resin of multi layer structure in which the outermost layer is a hard resin layer.

Further, still another example of the acrylic soft resin is described. Another example is composed of (A) an innermost hard polymer layer 5 to 30 parts by weight polymerizing a monomer mixture, which includes methyl methacrylate 80 to 98. 99 wt %, acrylic acid alkyl ester 1 to 20 wt % having an alkyl group with 1 to 8 carbon numbers, polyfunctional grafting agent of 0.01 to 1 wt % and polyfunctional cross-linking agent 0 to 0.5 wt %; (B) a middle hard polymer layer 20 to 45 parts by weight polymerizing a monomer mixture, which includes acrylic acid alkyl ester 70 to 99. 5 wt % having an alkyl group with 1 to 8 carbon numbers, methyl methacrylate 0 to 30 wt %, polyfunctional grafting agent 0.5 to 5 wt % and polyfunctional cross-linking agent 0 to 5 wt %; and (C) an outermost hard polymer layer 50 to 75 parts by weight polymerizing a monomer mixture, which includes methyl methacrylate 90 to 99 wt % and acrylic acid alkyl ester 10 to 1 wt % having an alkyl group with 1 to 8 carbon numbers, and is an acrylic soft resin of multi layer structure in which an average particle size is 0.01 to 0.3 μm.

When forming the film 10, a compounding ratio between the thermoplastic polyurethane and the acrylic soft resin is the thermoplastic polyurethane of 50 to 95 wt % and the acrylic soft resin of 60 to 5 wt %, preferably the thermoplastic polyurethane of 60 to 90 wt % and the acrylic soft resin of 40 to 10 wt %, more preferably the thermoplastic polyurethane of 70 to 90 wt % and the acrylic soft resin of 30 to 10 wt %.

Compounding of a mixed resin layer with plasticizer can improve flexibility and hand feeling of a product. Further, compounding of the plasticizer can help to lower a working temperature in calendering process of a mixed resin, thereby preventing the thermoplastic polyurethane from dissolving during process. As the plasticizer, phthalic acid ester such as di (2-ethylhexyl) phthalate, diisobuthy phthalate and diisodecyl phthalate; trimellitic acid ester such as tris (2-ethylhexyl) trimellitate; aliphatic dibasic acid ester such as di (2-ethylhexyl) adiplate, diisononyl adipate, di (2-ethylhexyl) sebacate, etc.; epoxy plasticizer such as epoxidized soybean, butyl epoxystearate, etc.; phosphate ester such as tricresyl phosphate; and citrate ester such as acetylcitric acid tributyl, etc. are used, Aromatic carboxylic acid ester such as phthalic acid ester, trimellitic acid ester, etc. is preferably used in view of high plasticization efficiency and less problem for bleed, etc. The amount of the compounded plasticizer is 0 to 50 parts by weight with respect to a mixed resin 100 parts by weight, preferably 3 to 20 parts by weight.

Lubricant, U.V. ray absorbing agent, light stabilizer, colorant, antibacteria agent, etc., which are usually used for compounding a synthetic resin, may be compounded in the mixed resin layer as necessary. As the lubricant, aliphatic metal salt such as stearic acid calcium, magnesium, zinc, barium, etc., polyethylene wax, stearic acid, alkylenebis fatty acid amid, etc. are used. As the U.V. ray absorbing agent includes benzotriazole U.V. ray absorbing agent such as 2-(2'-hydroxy-5'-methyl phenyl) benzotriazole, etc. are used. As the light stabilizer, hindered amine light stabilizer such as bis (2,2,6,6-tetramethyl-4-piperidyl) sebacate, etc. are used. As the antibacteria agent, silver inorganic antibacteria agent, etc. are used.

Shore A hardness of 60 to 80 is preferable for a mixed resin layer forming the film 10. This hardness can be obtained using thermoplastic polyurethane in Shore A hardness of 65 to 90 and acrylic soft resin in Shore A hardness of 50 to 80. And, with this hardness, it can be obtained such that the synthetic leather provides the same flexibility, hand feeling and touch as the synthetic leather, which has a soft polyvinylchloride layer compounding plasticizer (di-n-alkylphthalate) of 70 to 100 parts by weight in polyvinylchloride 100 parts by weight.

The surface treatment agent coating the film 10 is aqueous polycarbonate polyurethane cross-linked by aqueous cross-linking agent containing a carbodiimide group.

The aqueous cross-linking agent containing a carbodiimide group added to the surface treatment agent includes aliphatic carbodiimide, and the added amount is 4 to 10 parts by weight with respect to aqueous polycarbonate polyurethane 100, preferably 6 parts by weight.

As the base material 12, woven fabric, knitted fabric or unwoven fabric are used. The materials of these knitted, woven and unwoven fabric are polyamide fiber, polyester fiber, acrylic fiber, polypropylene fiber, cotton, rayon and blended yarn of these fibers, etc. As the knitted fabric, double faced knitting, sheet knitting, etc. and the woven fabric includes plain weave fabric, twilling, satin fabric, etc. are used.

The adhesive agent forming the adhesive layer 11 includes two-component polyurethane adhesive agent, ethylene-vinyl acetate copolymer emulsion, polyvinylchloride paste, etc. The adhesive agent may coat either the base material 12 side or on the film 10 side of the adhesive layer 11.

Prior art discloses a synthetic resin leather including a film, which is made of the mixed resin layer of thermoplastic polyurethane 50 to 95 wt % in Shore A hardness of 65 to 90 and acrylic soft resin 50 to 5 wt % in Shore A hardness of 50 to 80. The mixed resin layer is flexible, has resistance to surface scratch, can be welded with high-frequency welding, and has flame resistance and tear strength preventing extension of stitching. Also, the mixed resin layer of the film has Shore A hardness of 60 to 80.

A synthetic resin leather including a film composed mostly of thermoplastic polyurethane as described in the prior art has been developed in order to obtain flexibility and high flexurality, and in that sense is different than a synthetic leather having a tough film in development chronology. In the prior art, characteristic of intensity such as resistance to surface scratch or tear strength is improved in addition to flexibility or flexurality, however, a sufficient abrasion resistance cannot be obtained with respect to repeated friction caused by other members coming into contact with the surface. Thus, in the case where a synthetic resin leather is applied to outer covering of a vehicle seat, etc., a sufficient abrasion resistance is required in addition to high flexibility or flexurality.

Also, sweat, sebum, moisturizing lotion, etc. frequently adhere to outer covering of a vehicle seat, outer covering of a chair and a sofa, etc., and therefore resistance to olein acid is required as a characteristic of synthetic resin leather used for parts frequently coming into contact with human body directly or indirectly.

The invention described above solves the problem described above, and has effects described below. In the synthetic resin leather and the manufacturing method of the same according to the present invention, a synthetic resin leather having preferable abrasion resistance in addition to high flexibility and flexurality can be obtained. In particular, a surface treatment layer made of a cross linked film having high resistance to olein acid can be formed by coating with a surface treatment agent, in which aqueous polycarbonate polyurethane is cross linked by aqueous cross-linking agent containing a carbodiimide group, on the surface of the film composed mostly of thermoplastic polyurethane, and thus a surface treatment layer made of a cross linked film having high resistance to olein acid is formed, thereby keeping resistance to olein acid in addition to abrasion resistance.

Embodiment

The thermoplastic polyurethane, the acrylic soft resin, methyl methacrylate-alkyl acrylate copolymer, calcium carbonate, antioxidant agent, lubricant, U.V. ray absorbing agent, light stabilizer are compounded at a rate shown in Table 1, and the film 10 with thickness of 0.25 mm was formed by calendering.

In the embodiment 1, the surface treatment layer 10A was formed such that a surface treatment agent (cross-linking agent 6 parts by weight with respect to aqueous polycarbonate polyurethane 100 parts by weight) in which aqueous polycarbonate polyurethane was cross-linked by aqueous cross-linking agent containing carbodiimide group, and coated the surface of the film 10 with a thickness of 100 µm using the comma coat method, then applying an aging treatment of 55° C.×24H.

In the embodiment 2, the surface treatment layer 10A was formed such that a surface treatment agent (cross-linking agent 6 parts by weight with respect to aqueous polycarbonate polyurethane 100 parts by weight) in which aqueous polycarbonate polyurethane was cross-linked by aqueous cross-linking agent containing carbodiimide group and isocyanate cross-linking agent (compounding ratio 1/1), and coated the surface of the above-mentioned film 10 with a thickness of 100 µm using the comma coat method, then applying an aging treatment of 55° C.×24H.

As a comparative example, uncrosslinked aqueous polycarbonate polyurethane coated the film 10 with a thickness of 100 µm using the comma coat method.

In both the embodiment and the comparative example, the film 10 is heated at 160° C., pressed and striated between an embossing roller and a rubber roller, and the adhesive layer 11 was formed such that two-component polyurethane adhesive agent coated the base material 12 made of polyester fiber double faced stockinette stitch, and the film 10 was superimposed on the adhesive agent coated side and adhered thereon by applying heat and pressure in some degree, and thus a synthetic resin leather with a striated pattern was obtained.

With regard to these embodiments 1, 2 and the comparative example, each test result of abrasion resistance, cold resistant flexurality, flexibility and chemical resistance was shown in Table 1. Here, abrasion resistance test uses a Gakushin-Type Rubbing Tester prescribed in JIS L 0823 (friction tester for color fastness test) and a friction test was conducted at a load of 1 kg using a linen canvas No. 6 of JIS L 3102, thus break was checked under reciprocation of 30000 times (urethane foam of 10 mm×3 mm was attached and used as a test piece. ◯: No break in film; X: Break in film). Cold resistant flexurality was tested using a DeMattia Flexing Tester and a flexurality load was repeatedly applied to a test piece (70 mm×40 mm) at a constant stroke based on JIS K 6260, thus crack was checked under repetition of −30° C.×30000 times (◯: No crack, X: crack). Flexibility was evaluated such that feeling by hand touching of the test piece was compared with soft polyvinylchloride synthetic leather to check if the same flexibility could be obtained (◯: the same feeling can be obtained, X: hard touch, soft polyvinylchloride synthetic leather cannot be replaced). Chemical resistance was evaluated such that four filter papers were interposed on a test piece provided in any size and a few drops of olein acid (1.2 ml) were put thereon. Then it was sealed with aluminum foil and left under environment of 80° C. for 24 hours, and then, taken out and wiped as patting the surface, and thus uplift of the test piece, break, come-off of the treatment layer were visually checked (◯: good, Δ: slightly had, X: bad).

embodiment 2 does not indicate such a good result, and the comparative example indicates a bad result.

A synthetic resin leather according to an example of the present invention is provided with preferable abrasion resistance in addition to preferable flexibility and flexurality. In particular, surface treatment agent in which aqueous polycarbonate polyurethane is cross linked by aqueous cross-linking agent containing a carbodiimide group coats the surface of the film 10 composed mostly of thermoplastic polyurethane, and thus the surface treatment layer 10A having high chemical resistance (olein acid resistance) can be formed, thereby enabling the synthetic resin leather to keep preferable abrasion resistance even for use where a part of human body frequently comes into contact. The synthetic resin leather according to an embodiments of the present invention can be used for various purposes making advantage of the merits. For example, the synthetic resin leather can be used for the interior of a vehicle such as a car (seat, head rest, etc.).

What is claimed is:

1. A vehicle interior material comprising a synthetic resin leather including a base material adhered via an adhesive layer to a back side of a film composed of thermoplastic polyurethane, wherein a front side of the film has a surface treatment layer formed on a surface thereof, and the surface treatment layer is formed by coating the surface of the front side of film with a surface treatment agent in which an aqueous polycarbonate polyurethane is cross linked by an aqueous cross-linking agent containing a carbodiimide group to form the vehicle interior material.

2. The vehicle interior material according to claim 1, wherein the film is a mixed resin layer of thermoplastic poly-

TABLE 1

| | | embodiment 1 | embodiment 2 | comparative example |
|---|---|---|---|---|
| film | thermoplastic polyurethane | 80 | 80 | 80 |
| | acrylic soft resin | 20 | 20 | 20 |
| | methyl methacrylate - alkyl acrylate copolymer | 5 | 5 | 5 |
| | calcium carbonate | 10 | 10 | 10 |
| | antioxidant agent | 0.3 | 0.3 | 0.3 |
| | lubricant | 0.5 | 0.5 | 0.5 |
| | U.V. ray absorbing agent | 0.7 | 0.7 | 0.7 |
| | light stabilizer | 0.3 | 0.3 | 0.3 |
| surface treatment layer | aqueous polycarbonate polyurethane | 100 | 100 | 100 |
| | carbodiimide cross-linking agent | 6 | 3 | — |
| | isocyanate compound | — | 3 | — |
| evaluation | abrasion resistance | ◯ | ◯ | X |
| | cold resistant flexurality | ◯ | ◯ | ◯ |
| | flexibility | ◯ | ◯ | ◯ |
| | chemical resistance | ◯ | Δ | X |
| | total evaluation | ◯ | ◯ | X |

As Table 1 clearly shows, when comparing the embodiments 1, 2 with the comparative example, both obtain preferable evaluations in cold resistant flexurality and flexibility due to common resin components in the film. However, low abrasion resistance was shown in the comparative example due to difference in the surface treatment layer, while preferable evaluation could be obtained still in abrasion resistance in the embodiments 1, 2. Further, in chemical resistance, although the embodiment 1 indicates a preferable result, the urethane 50 to 95 wt % in Shore A hardness of 65 to 90 and acrylic soft resin 50 to 5 wt % in Shore A hardness of 50 to 80.

3. A method of manufacturing a synthetic resin leather for use as a vehicle interior material, the method comprising the steps of:
   forming a film formed of thermoplastic polyurethane;
   forming a surface treatment layer on the surface of the front side of the film by coating the surface of the front side of the film with a surface treatment agent in which an aqueous polycarbonate polyurethane is cross linked by an aqueous cross-linking agent containing a carbodiimide group; and adhering a base material via an adhesive layer to the back side of the film to form the vehicle interior material.

4. The method according to claim 3, wherein the step of forming the film is performed by calendaring.

* * * * *